Patented July 28, 1931

1,816,338

UNITED STATES PATENT OFFICE

SIDNEY MUSHER, OF WASHINGTON, DISTRICT OF COLUMBIA

FOOD PRODUCT

No Drawing.   Application filed October 29, 1927.   Serial No. 229,800.

My invention relates to an edible composition adapted for use as a food compound as well as a candy or similar confection, and which may be mixed with dressings or chocolate, put into brittle form, or used as a sandwich or cracker spread with or without cheese, mayonnaise, or salad dressings.

An object of my invention is the provision of a peanut or kindred butter composition wherein rancidity and spoilage to which such butters are subject are reduced to a minimum hitherto not realized.

Another object of my invention is the provision of a food product having a new and very pleasant flavor.

Further objects and advantages will appear in the following descriptions.

It has long been recognized that such products as nut butters, seed cakes and butters such as olive butter form very complete and staple foods. It is likewise appreciated that in commercial use these products must be closely guarded against rancidity, as no method has as yet been devised for the inhibition of their rancidity or spoilage to any degree. Rancidity in peanut butter, for example, seems to be due to certain inherent qualities in the oil in its admixture in the peanut.

I have discovered that when crushed sesame seed is added to commercial peanut butter, rancidity of the butter, to all practical purposes, is almost entirely inhibited. The resulting composition will keep in perfect condition for three or more times longer than heretofore. The sesame seed appears to serve in the capacity of a preservative for the butter. This crushed sesame seed tends to neutralize those factors which produce rancidity in the oil. In specimens of my improved product which contained 75% peanut butter and 25% crushed sesame seed, no evidences of rancidity have been detected after a period of one and one-half years.

I have also discovered that by the addition of the crushed sesame seed to peanut butter, a very pleasantly flavored food or confection is produced. The sweetness of the peanut butter and the nutty flavor of the sesame seed blend to form a new tasty combination. It has been found that the undesirable quality of peanut butter to draw the mouth is largely eliminated as a result of the effects of the crushed sesame seed added thereto.

My invention contemplates not only the addition of pure crushed sesame seed to nut and similar butters but also of any candy or edible composition which contains a large percentage of sesame seed such as, for example, what is known to the trade as Halvah. Halvah acts on peanut butter in substantially the same way, Halvah being a confection comprising merely roasted or unroasted crushed sesame seed combined with glucose or other sugar substance and a flavoring.

To vary the taste of the composition, it may be desirable to add a small percentage of sugar or flavoring such as vanilla or chocolate. Milk powders may also be added to aid in the absorption of the excess oil on the surface of the product.

It is to be understood that I do not limit myself to the use of crushed sesame seed with peanut butter alone. The advantageous effects of crushed sesame seed have also been apparent when mixed with nut butters such as almond butter, seed cakes such as soya-bean cake and sunflower seed cake and olive butter, and with combinations of these butters.

While the proportion hereinbefore stated is that which I prefer to employ, it is also to be understood that it may be modified to a large extent without departing from the spirit of the invention and the scope of the appended claims. The proportion is determined to an extent by the flavor desired, taking into consideration, of course, that the keeping qualities of the resulting product depends on the percentage of crushed sesame seed therein.

What I claim is:—

1. A food product comprising a butter subject to rancidity and such percentage of crushed sesame seed as will inhibit rancidity in said butter.

2. A food product comprising 75% of a butter subject to rancidity, the remaining percentage containing a sufficient quantity of crushed sesame seed to inhibit rancidity in said butter.

3. The method of inhibiting rancidity in peanut butter comprising mixing the butter with a substantial percentage of crushed sesame seed.

4. The method of inhibiting rancidity in peanut butter comprising mixing approximately 75% peanut butter with approximately 25% crushed sesame seed.

SIDNEY MUSHER.